United States Patent [19]

Efrom

[11] Patent Number: 4,610,463

[45] Date of Patent: Sep. 9, 1986

[54] PROTECTION ASSEMBLY FOR ABDOMINAL AREA

[76] Inventor: Harriet Efrom, 4533 Adams Ave., Miami Beach, Fla. 33140

[21] Appl. No.: 681,811

[22] Filed: Dec. 14, 1984

[51] Int. Cl.⁴ .............................................. B60R 21/04
[52] U.S. Cl. .................................... 280/751; 280/801; 297/464; 297/488
[58] Field of Search ....................... 280/748, 751, 801; 297/216, 464, 487, 488

[56] References Cited

U.S. PATENT DOCUMENTS 3,232,665  2/1966  von Wimmersperg ............. 297/488
3,936,075  2/1976  Jelliffe ................................. 280/751

Primary Examiner—John J. Love
Assistant Examiner—Kenneth R. Rice
Attorney, Agent, or Firm—John Cyril Malloy

[57] ABSTRACT

A protection assembly generally in the form of a shield used to protect the abdominal area of a pregnant woman especially when seated in a vehicle or like structure. A dome-like shield is specifically configured to overlie and at least partially surround the abdominal area which, in a pregnant woman, is generally distended dependent upon the length of the term of pregnancy. Force directing means are secured to opposite ends of the extremities of the shield-like casing and disposed in abutting relation to supporting surfaces of a seat or like structure on which the user is positioned. The casing is sufficiently spaced from the abdominal area of the user such that when any force is exerted thereon, such as contact with the steering wheel or other interior portions of the car in an emergency situation, such forces are effectively absorbed by the casing and transferred to the seat or like supporting structure and not to the abdominal area or the fetus being carried. The casing is further disposed to engage the user, such as in emergency stops, in a manner which will more evenly distribute any stress or force exerted on the user in an area surrounding the abdominal area rather than directly thereon.

14 Claims, 15 Drawing Figures

PROTECTION ASSEMBLY FOR ABDOMINAL AREA

BACKGROUND OF THE INVENTION

1. Field of the Invention

This invention is directed towards a protection assembly generally in the form of a covering or overlying shield at least partially surrounding the abdominal area of a pregnant woman and primarily designed for use in vehicles to prevent any blows or other forces being delivered directly to such abdominal area thereby providing additional protection to the unborn child against such forces. The shield assembly is secured in place by existing seat belts and includes a casing having force directing means secured thereto wherein the casing and such force directing means are cooperatively structured to transfer any absorbed forces primarily to the supporting seat or like structure on which the user is supported or positioned.

2. Description of the Prior Art

Various safety devices exist in the prior art which are primarily designed for the protection of occupants of an automobile during emergency situations. Such prior art structures include lap and/or shoulder safety harnesses, cushions, padding, air bags, all of which are generally intended to maintain the occupant of a vehicle within his seat when the vehicle is involved in a collision or comes to an emergency stop or slow down. While many of such structures are effectively designed for accomplishing their intended purpose, none of such prior art structures of which the inventor is aware, are specifically utilized for the protection of the abdominal area of a pregnant woman. Specifically, while many of the noted devices sufficiently and effectively maintain an occupant or driver of a vehicle within the seat, numerous of such structures frequently allow forces or stresses to be exerted on the body concurrently to restrain it. This is particularly true of conventional safety harnesses which comprise lap and/or shoulder straps and which are commonly referred to as seat belts. Such a safety harness covers and/or frequently overlaps the portions of the abdominal area such that during a collision or sudden stop force is exerted directly thereon. Such force would normally be absorbed directly by the abdominal area of the body and would have a natural tendency to harm an unborn child if such forces were exerted directly on the distended abdominal area of a pregnant woman.

Accordingly, there is a need in this field for a protection or shield assembly specifically designed to absorb any extraordinary force or stress applied to the abdominal area. Such force is instead transferred or directed to the supporting structure and/or seat on which the user is positioned.

SUMMARY OF THE INVENTION

The present invention is directed towards a protection assembly in the form of a shield or similarly configured casing designed to protect the abdominal area of a pregnant woman from forces being exerted thereon. More particularly, the shield or protection assembly of the present invention is designed to be mounted in at least partially surrounding relation to the abdominal area of a pregnant woman when seated in a vehicle such as an automobile, airplane, etc.

A casing is formed from a substantially rigid high resistance material and has an outwardly protruding configuration generally similar in dimension and configuration to the outwardly exending or protruding abdominal area of a woman in various stages of pregnancy. Accordingly, the outer or exposed surface of the casing is partially spherical and has a convex cross-sectional configuration. Similarly, the interior surface of the casing has a substantially concave cross-sectional configuration. An appropriate padding such as foam or sponge rubber is affixed to portions of the casing particularly along the inner surface area so as to add comfort and prevent continuous direct contact of the casing with the abdominal area which it surrounds. Further, the overall dimension and configuration of the casing is such that the inner surface and preferably the padding located therealong are maintained in spaced relation from the abdominal cavity such that any forces directed onto the casing will not be transferred to the abdominal area but will be directed or transferred to a supporting seat structure on which the user of the device is positioned.

To accomplish the above, a force directing means is incorporated within the casing and is disposed in either fixed or adjustably mounted position relative to opposite ends of the casing. Such force directing means comprises a flange portion connected and disposed to define an extremity of each of the longitudinal ends. In one embodiment, to be described in greater detail hereinafter, the force directing means is disposed in a substantially outwardly flared relation to opposite longitudinal ends of the casing thereby defining the extremities thereof. The force directing means further includes a foot portion exposed in outwardly extending angled relation to both the plane of the flange and the outer surface of the casing. The foot portion is further disposed to define an extremity of the end along the lower peripheral boundary or edge thereof. The flange portion of each end of the casing is disposed in substantially abutting relation to the backrest portion of the seat supporting the user while the foot portion is arranged in a somewhat horizontal orientation so as to be positioned in abutting relation to the exposed surface of the seat portion of the seat structure.

Further, the force directing means may be integrally or fixedly attached to opposite ends of the casing for abutting relation to the exposed surface of the seat structure in the manner set forth above. Alternately, the force directing means may include adjusting means specifically structured to selectively position the force directing means. Such includes the flange and foot portion of each end of the casing connected in adjustable relation thereto so as to selectively vary the distance from which the casing may project outwardly or extend away from the user of the device as well as the exposed surface of the seat structure. Such adjustment facilities are provided to accommodate variances in outward projection of the distended abdominal area of a pregnant woman dependent upon the stages or term of pregnancy. For example, the outward projection of the abdominal area of a woman would be much greater in her third trimester of pregnancy as versus her first trimester. Therefore, the force directing means would be selectively positioned to dispose and maintain the casing at a greater outwardly projecting distance from the exposed surfaces of the seat structure on which the user is supported, during the third trimester of pregnancy.

Alternately, the protection assembly could come in one of a plurality of sizes wherein the distance from which the casing projects outwardly from the supporting seat is nonadjustable. However, in such a situation the outwardly extended dimension or overall configuration and dimension of curvature of the casing would vary between a plurality of substantially standard sizes to accommodate for the variance in the outward projection of the abdominal area dependent upon the stages of pregnancy. It is important to note that in each of the embodiments, the casing would be maintained in sufficiently spaced distance from the abdominal area so that all forces directed onto the casing would be absorbed by the seat structure rather than the user of the assembly.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference characters refer to like parts throughout the several views of the drawings.

DETAILED DESCRIPTION OF THE PREFERRED EMBODIMENT

Figure 1:
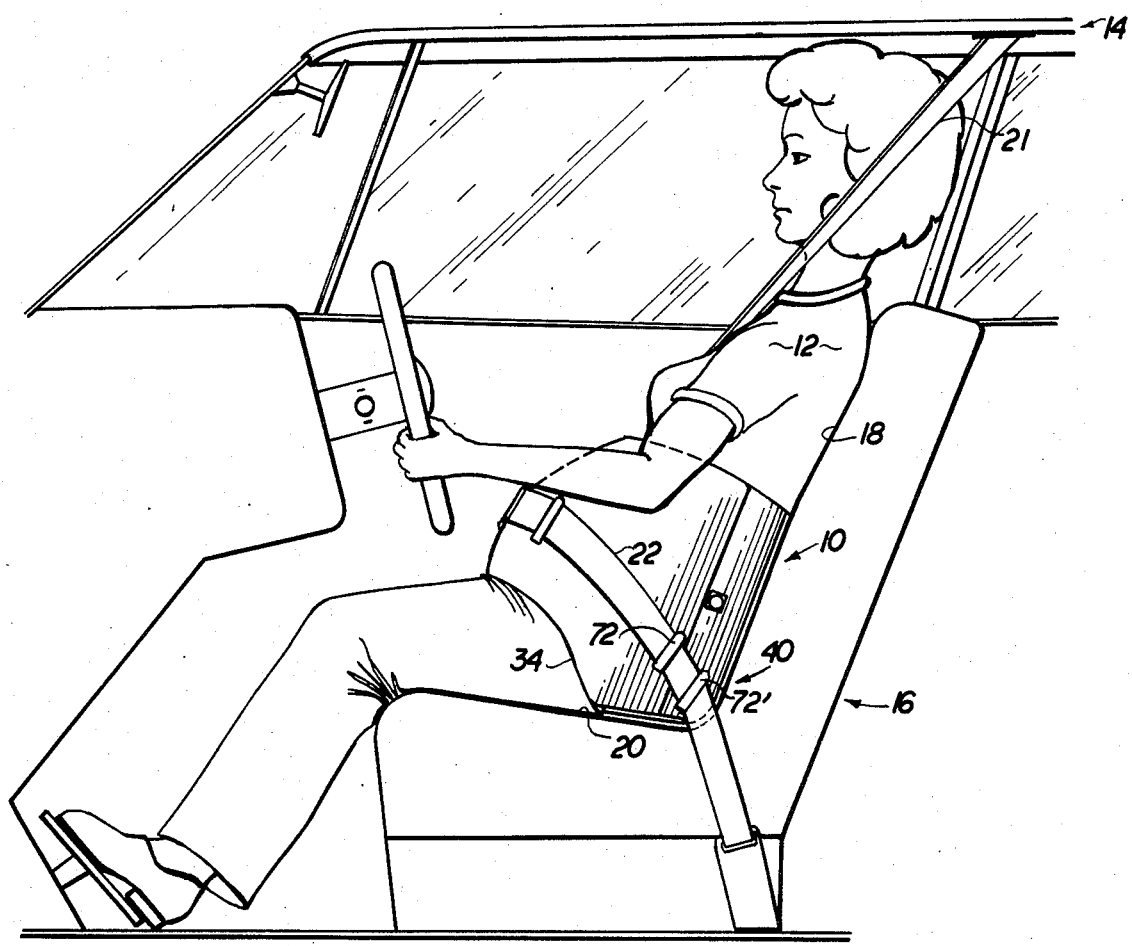
FIG. 1 is a side elevational view of the protection and shield assembly of the present invention disposed in its protective position about a user seated within a vehicle.

The present invention is directed towards a protection assembly including a shield structure generally indicated as 10 in FIG. 1 designed to protect the abdominal area of a pregnant woman generally indicated as 12 while seated in a vehicle 14 or like structure. The vehicle, while represented hereinafter as an automobile, may be any type of vehicle structure wherein an occupant 12 is seated and requires some protection from external forces being exerted against the abdominal area. The seat structure generally indicated as 16 is of conventional design and per se does not form a part of the present invention. However, the protection assembly 10 of the present invention is structured and configured for cooperative, abutting engagement with the supporting surfaces of the backrest 18 and seat portion 20 in a manner which will be explained in greater detail hereinafter. It should be noted however that the seat structure 16 could be defined by a number of varying designs and/or configurations and still have the protection assembly 10 mounted thereon in protective relation to a user 12. Also with reference to FIGS. 1, 2, and 3, the protection assembly 10 is designed to be maintained in at least partially surrounding and protecting relation to the user 12 through cooperation with a standard safety harness which may include shoulder strap 21 and/or lap belt 22. The safety harness disclosed is representative only and could assume a number of various structures and configurations and still accommodate maintenance of the seat assembly 10 in proper position relative to the user 12.

Figure 4:
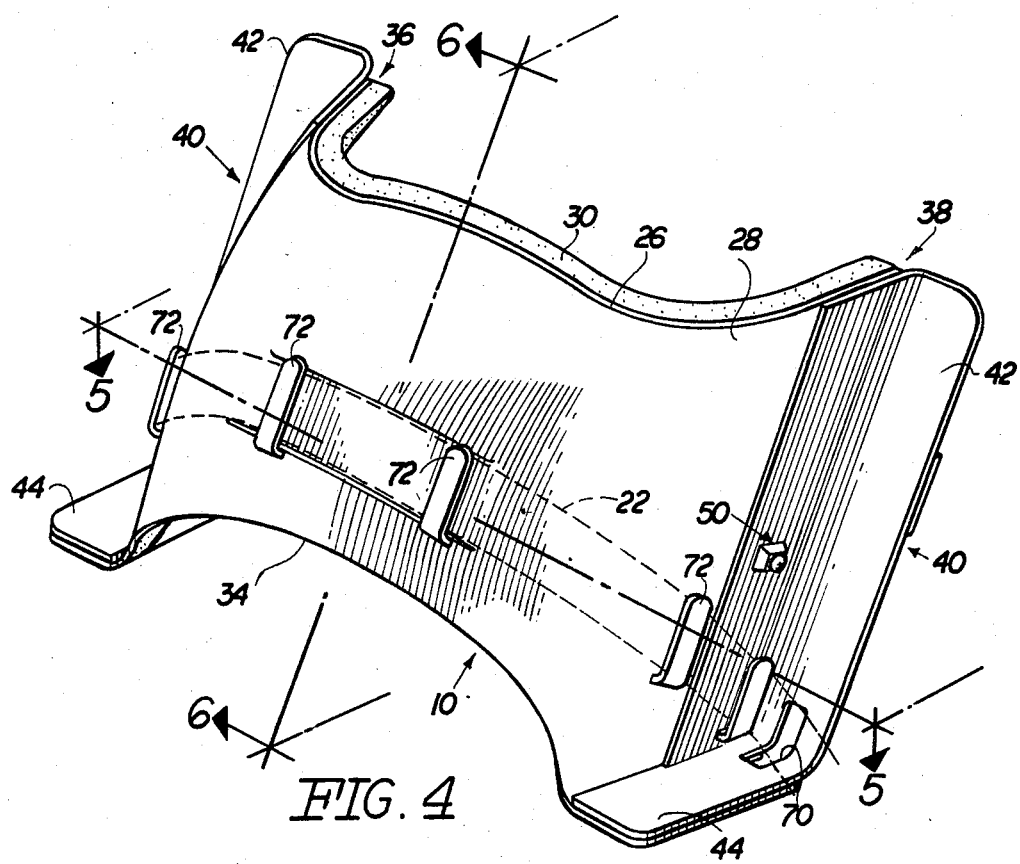
FIG. 4 is an isometric view of exterior portions of the casing wherein attachment structure is provided for cooperation with a conventional safety harness or seat belt.
Figures 5, 6:
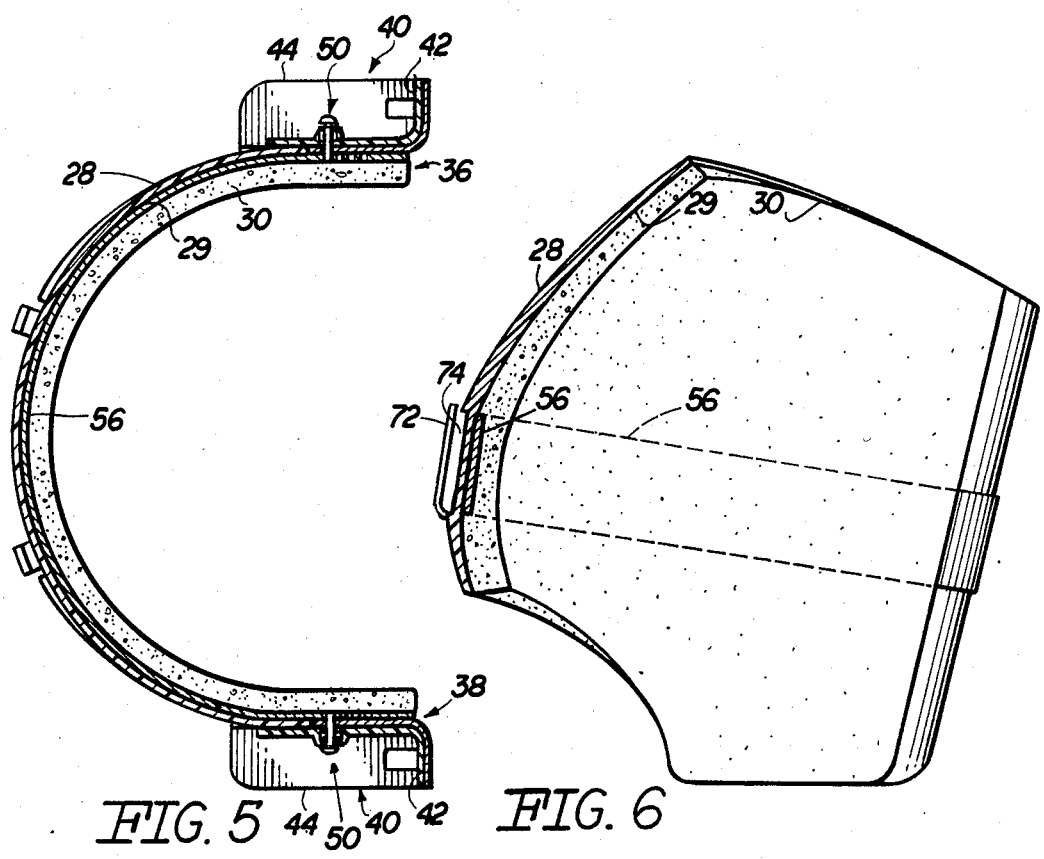
FIG. 5 is a sectional view along line 5—5 of FIG. 4.
FIG. 6 is a sectional view along line 6—6 of FIG. 4.

In a preferred embodiment, the protection assembly 10 comprises a casing 26 formed of rigid, high resistance material capable of withstanding blows, forces or any stress applied to the exterior surface 28 thereof such as by a steering wheel or other parts of the vehicle. With regards to FIGS. 4, 5 and 6, the casing 26 comprises an exterior surface 28 and an interior surface 29, The exterior surface 28, as best shown in FIG. 4, is at least partially spherical and has a convex cross-sectional configuration (FIG. 5). Similarly, the interior surface 29 has a substantially concave cross-sectional configuration and further includes a cushion or padding material 30 secured thereto. The material 30 may be foam or like resilient and generally soft material and is provided so as to add to the comfort of the user 12. However, an important structural feature of the present invention is its dimensioning such that the casing and particularly the inner surface 29 and surrounding padding 30 is generally disposed in spaced relation to the outwardly extending abdominal area of the user 12. This is to insure that any forces directed against the exterior surface 28 of casing 26 are not transferred to or absorbed by the outwardly projecting abdominal area of the pregnant woman 12.

The transverse dimension of the casing 26 is such as to be generally disposed beneath the bustline and/or adjacent and in surrounding relation to the upper portion of the rib cage. Variation in dimension and configuration will accommodate changes in size of the protruding abdominal area of the user as will be explained in greater detail with regard to FIG. 15 hereinafter. The lower peripheral edge as at 34 may be specifically configured to raise above the legs or thighs of the user (FIGS. 1-3) and accommodate normal placement of the legs as shown in FIGS. 1, 2, 3, 13 and 14. Opposite longitudinal ends as at 36 and 38 are secured to force directing means generally indicated as 40. The structure of the casing 26 as well as the placement of padding 30 further insures that forces, created when the vehicle 14 comes to a sudden stop, will be substantially evenly distributed on the user's body in surrounding relation to the abdominal area thereof, but not directly thereon.

Figure 2:
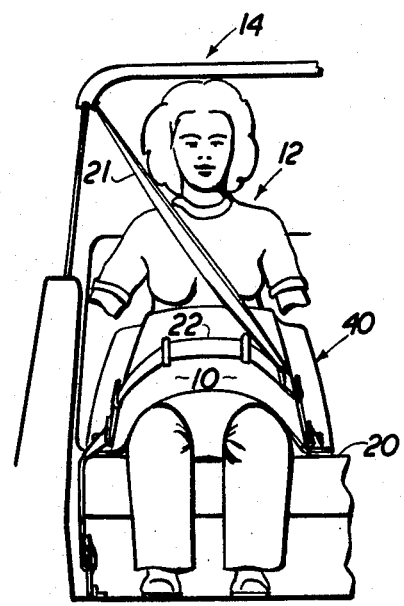
FIGS. 2 and 3 are front elevational views of the protection assembly of the present invention mounted in substantially surrounded relation to passengers seated in different locations within the front seat of an automobile or like vehicle.
Figure 3:
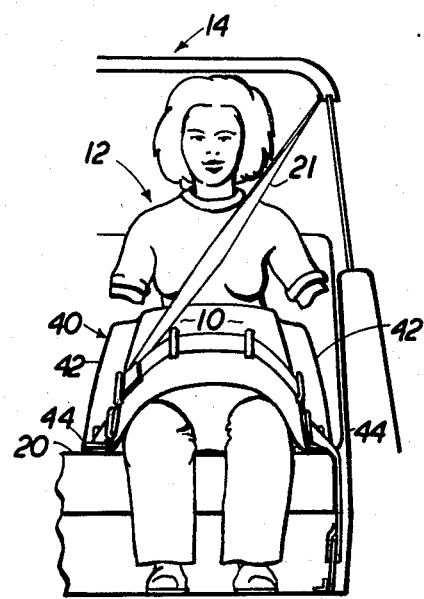

The force directing means 40 comprises outwardly extending flange elements 42 structured and configured to define extremities of each of the opposite longitudinal ends 36 and 38. Each of the flanges 42, as in the embodiments herein described, are substantially outwardly extended and flared so as to be positionable in abutting relation with the exposed surface of the backrest 18 of the seat structure 16 (see FIG. 1). In that the force directing means 40 engages the backrest 18, in the manner described, on opposite sides of the user 12, the force directing means 40 serves to effectively transfer any force exerted on the outer surface 28 of casing 26 to the seat structure 16 through the backrest as well as the seat portion 18 and 20 respectively. Accordingly, the force directing means 40 further includes a foot portion 44 disposed to extend outwardly from the outer surface 28 of casing 26 and also to extend away from in substantially angularly oriented and somewhat transverse relation to the length of the flange 42. Therefore, each extremity of opposite longitudinal ends 36 and 38 of casing 26 is defined both by the flanges 42 and the foot portions 44. The foot portions 44 therefore are disposed to be positioned in abutting relation with the exposed surface of the seat portion 20 (FIGS. 1 through 3).

Figure 8:
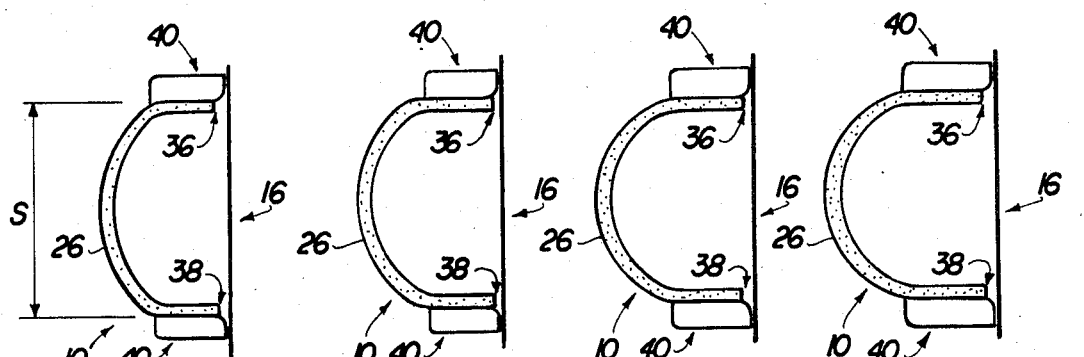
FIG. 8 is a top view of one embodiment of the present invention in varying sizes.
Figures 9, 10, 11:
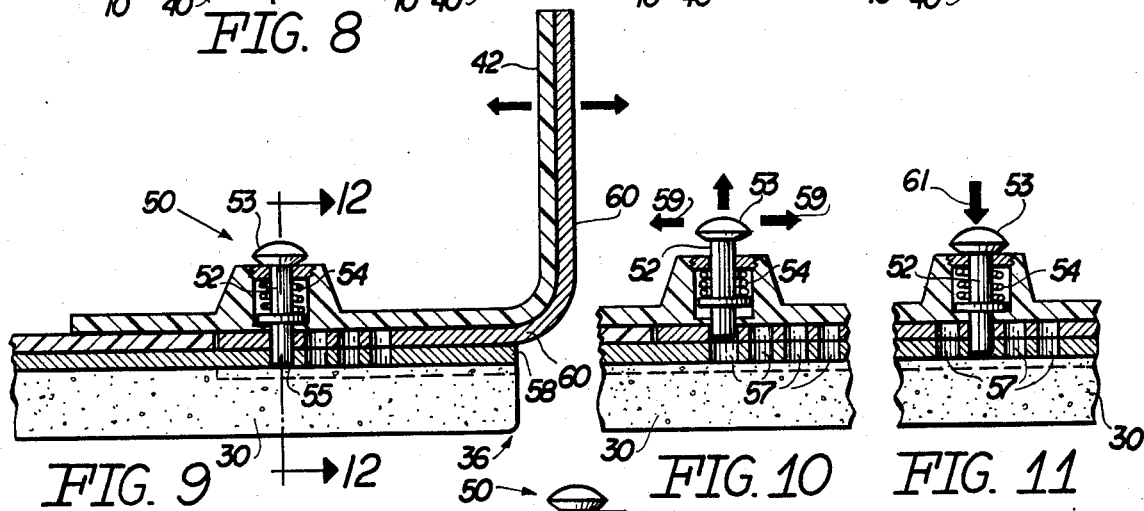
FIG. 9 is a sectional view in partial cutaway showing structural details of an adjustment assembly for adjusting the outward extension of the protection assembly relative to a supporting seat for the user.
FIGS. 10 and 11 are sectional views in partial cutaway showing operation of the adjustment assembly as shown in FIG. 9.

The force directing means 40 including both the respective flanges 42 and foot portions 44 of each extremity 36 and 38 are structured to be integrally or otherwise fixedly secured to the respective ends 36 and 38 as shown in FIG. 8. When fixedly positioned, the casing 26 may be particularly dimensioned to extend outwardly a varying amount from the seat structure 16 in order to accommodate various degrees of extension of the abdominal area of the user of the protection assembly based on the length of pregnancy. Therefore, the longer the term of pregnancy the greater the outward extension of casing 26 is provided relative to the seat structure 16. In that the force directing means 40 is fixedly secured to the casing, it will always be disposed in abutting relation to the correspondingly positioned exposed surfaces of the seat structure 16 for the reasons set forth above. With further regard to FIG. 8, the transverse dimension generally indicated as S may also vary depending upon the size of the individual user and, for instance, may come in a small, medium, large or extra large width S. Each of these sizes therefore would then come in varying outer extensions of casing 26 relative to the seat structure 16 in order to accommodate various size users of the protection assembly 10 when in varying stages of pregnancy.

Another embodiment of the present invention is best shown in FIGS. 4, 5 and 9 through 12. In such embodiment, the outward extension of the casing 26 effectively remains the same. However, the distance between the ends 36 and 38 of the casing and the seat structure 16 may vary by selectively adjusting the positioning of the force directing means 40 relative to the respective ends 36 and 38. In order to accomplish such adjustment, a locking fixture generally indicated as 50 may be provided. Such locking fixture includes a longitudinally movable pin 52 having an enlarged head portion 53 for grasping thereof. Head portion 53 is rounded to avoid injury to the user during inadvertent contact therewith. Biasing means in the form of a spring element 54 is mounted as shown in FIGS. 9 through 12. The action of biasing spring element 54 serves to normally force the pin in its inward position (FIGS. 9 and 11) whereby the distal end 55 is forced through one of a plurality of locking aperture pairs 57. The locking aperture pairs are formed in alignable relation to one another and in correspondingly positioned ends 58 and 60 of a reinforcing element to be explained in greater detail hereinafter. The reinforcing element 56 has a curvilinear, longitudinal configuration and is affixed to the inner surface 29 of the casing 26 (see FIGS. 5 and 6). The reinforcing element is provided to give additional strength and thereby resist forces applied to the external surface specifically and the casing generally. Ends 60 of the reinforcing element 56 is adjustably positioned relative to end 58 thereof so as to regulate the position of flange 42 and foot portion 44 relative to each extremity 36 and 38. This therefore regulates the outward position of the casing 26 relative to the exposed surfaces of the backrest 18 and seat portion 20 of the seat structure 26 to accommodate for any variance in outward extension of the abdominal area of the pregnant user 12 based upon an advanced term of pregnancy. To accomplish such adjustment, pin 52 is pulled outward in accordance with the indicated directional arrow against biasing spring 54 and moved selectively in accordance with directional arrows 59 to regulate the respective postions between ends 60 and 58 of the reinforcing element 56. When the proper position is found, the pin 52 is allowed to move inwardly in accordance with directional arrow 61 into fixed, positive engagement between the ends 58 and 60 through aligned aperture pairs 57.

Figure 12:
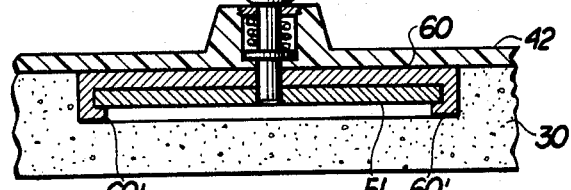
FIG. 12 is a sectional view in partial cutaway along line 12—12 of FIG. 9.
Figures 13, 14:
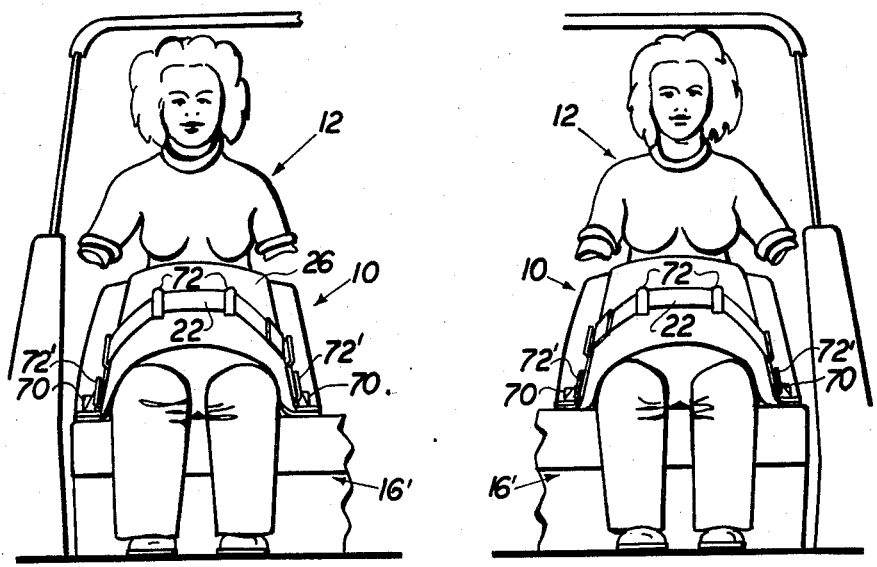
FIGS. 13 and 14 are front elevational views of one embodiment of the present invention shown in surrounding relation to an occupant seated at various locations in the back seat of an automobile or like vehicle.

With regard to FIG. 12, end portion 58 of reinforcing element 56 is effectively slidable within a channel integrally formed in end 60 by inwardly directed peripheral flanges 60' in order to prevent lateral skewing between the two ends 58 and 60 when such adjustment is made and/or when external forces are being applied to the exterior of casing 26 and transferred, through force directing means 40 to the respective expsosed surfaces of backrest 18 and seat portion 20 of the seat structure 16.

It should be noted that the reinforcing element 56 is of integral, one-piece construction when considering the embodiment as shown in FIG. 8 comprising the force directing means 40 being integrally or fixedly secured to the respective end portions 36 and 38 of the casing 26.

The above set forth adjustment facility has been described primarily with regard to the relative positioning of flange 42 to the remainder of the casing 26 so as to regulate or control the outward position of the casing from the backrest portion 18. It should be noted however that similar adjustment facilities can be incorporated in the structure of the present invention relating to the upward adjustment of the casing and the relative positioning of foot portion 44 of the force directing means 40 relative to the casing 26. Such relative positioning would accommodate any "upward" adjustment in order to comfortably surround the thighs of the user and maintain the lower edge 34 in a preferred position relative to the legs or thighs of the user.

Figure 7:
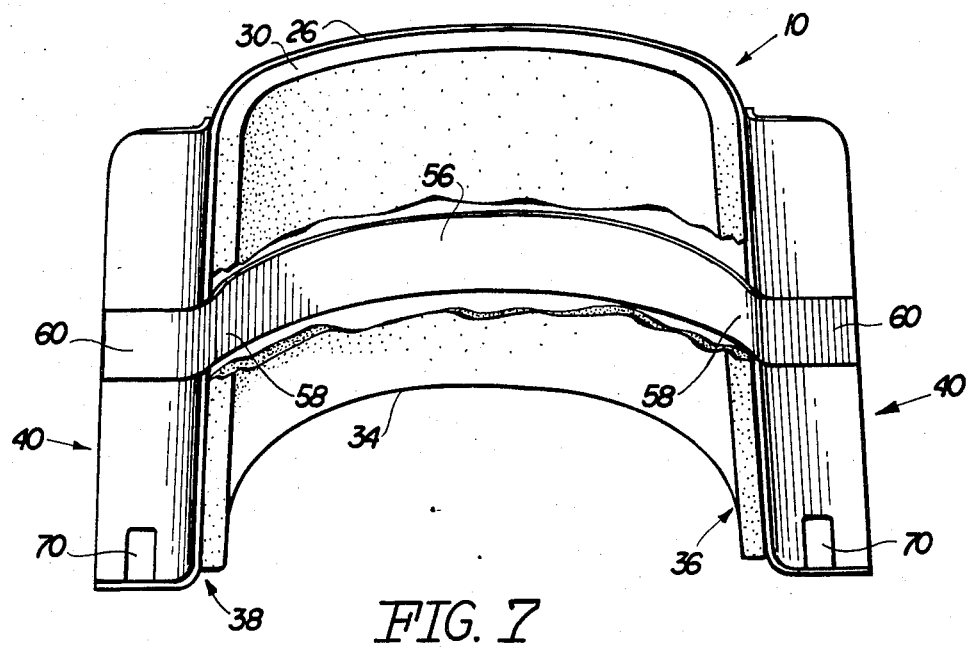
FIG. 7 is a rear elevational view in partial cutaway showing structural components of the present invention.

The protection assembly 10 of the present invention further comprises attachment means used to maintain the casing 26 in proper surrounding and protective relation relative to the abdominal area of the user 12. Such attachment means includes apertures 70 formed in each of the extremities of the casing adjacent to or integral with force directing means 40 as clearly shown in FIG. 7. More specifically, the aperture 70, in a preferred embodiment, is formed in both the flange 42 and the foot portion 44 at substantially the junction therebetween. These apertures are of sufficient dimension to allow connecting buckles and/or straps of conventional safety harness 21, 22 in a vehicle to pass therethrough. The attachment means further comprises open ended hook elements 72 positioned to embrace and maintain a seat belt strap 22 or other appropriately positioned parts of the safety harness in overlying relation relative to the exterior surface 28 of the casing 26 in the manner best shown in FIG. 4.

With regard to FIGS. 1, 2 and 3, it is seen that when the user 12 is positioned in the front seat of an automobile type vehicle, the lap belt 22 does not fit through the aperture 70 on one side of the casing. Rather, the lap belt 22 fits around the end of the force directing means 40 and is positioned on the interior of the first most open ended hook element 72' as well as the remaining hook elements 72. This is due to the fact that in the front seat of an automobile type vehicle, especially of modern design, the lap belt 22 is generally connected to or defines an integral part of the shoulder strap 21 which prevents its passage through the aperture 70.

With regard to FIG. 6, indentation means 74 may be integrally formed in the outer surface 28 to accommodate the strap 22 and/or additional buckling or coupling facilities which may be used in combination with certain safety harnass designs and structures. It is important to note that the relative structure and position of the apertures 70 as well as the open hook elements 72 and 72' are such as to cooperate with safety harness (belt 21 and 22) and retain the protection assembly 10 in its proper protecting position relative to the user 12 regardless of the position in the vehicle occupied by the user 12 as best shown in FIGS. 2 and 3. Accordingly, the safety harness including straps 21 and 22 may be disposed in retaining, overlying relation to the protection assembly 10 by being attached to the interior of the vehicle in any of a number of positions. The versatility of the protection assembly 10 of the present invention is further demonstrated by its application in surrounding relation to a user 12, in the manner described above, when the user is seated in various positions in the rear seat structure 16' of a vehicle or like automobile. When so positioned, the user is normally protected only by a single lap belt 22 and not the additional shoulder belt or strap 21 as shown in FIGS. 1 through 3. In such an embodiment, both ends of the belt 22 extend through respectively positioned apertures 70 on each side of the casing 26 and further pass through the open ended hook elements 72 and 72' in order to insure retention of the lap belt 22 in surrounding relation to the outer surface of the casing 26.

Figure 15:
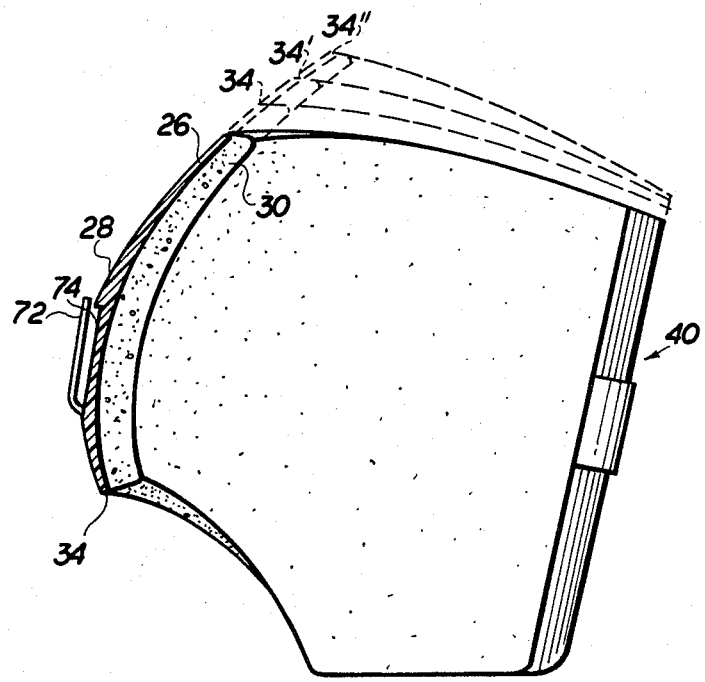
FIG. 15 is a sectional view of the embodiment of FIG. 4 wherein the height at which the casing extends varies depending upon varying sizes of the casing intended to accommodate women of varying sizes and in different stages of pregnancy.

With regard to FIG. 15, it is seen that regardless of the embodiment utilized concerning an integral construction or an adjustable construction (FIG. 8 and FIG. 4 respectively), the casing 26 may be structured in various dimensions and configurations in order to accommodate the variation in shape and degree of protrusion of the abdominal area which in turn is dependent upon the size of the expectant mother and the length of pregnancy. Therefore, FIG. 15 shows different heights at which the upper edge 34' may be positioned to accommodate various sized users of the protection assembly 10 such that in an emergency situation, the upper and lower edges only would possibly come into contact with the user above and below the abdominal area where the unborn child is positioned when being carried.

A safe and convenient protector is provided. While the embodiments and applications of the invention have been described herein it should be apparent to those skilled in the art that additional modifications are possible without departing from the scope of the intended invention herein described. The invention, therefore, is not to be interpreted in a limiting sense and the scope of the invention is defined by the claims hereinafter set forth.

What is claimed is:

1. A shield assembly of the type primarily designed to protect the abdominal area of a pregnant woman against external forces exerted thereon while seated, said assembly comprising:
   (a) a casing formed of a rigid, high resistance material, being configured to include an outward projection and being dimensioned for at least partially surrounding and overlying relation to an abdominal region of a user's body,
   (b) attachment means mounted on said casing and structured for removable securement of said assembly on a structure supporting the user,
   (c) said casing comprising an outer surface and an inner surface, said outer surface including an overall, generally convex configuration and said inner surface comprising a substantially overall concave configuration, said inner surface disposed in substantially covering and at least partially spaced relation to the abdominal portion of the user,
   (d) force directing means secured to opposite longitudinal ends of said casing for transfer of forces exerted on said casing to the supporting structure, and
   (e) said force directing means disposed on opposite sides of the user and in abutting, force transferring engagement with surface portions of the supporting structure of the user, and
   (f) reinforcing means secured to said casing for strengthening thereof and disposed to extend along the length of said casing and terminate adjacent said opposite longitudinal ends of the casing.

2. An assembly as in claim 1 wherein said attachment means comprises an aperture means formed in said force directing means and further comprising a plurality of keeper elements mounted on said outer surface and structured to removably engage and maintain a safety harnass in overlapping, retaining relation to said outer surface, whereby the safety harness is associated with the support structure for the user.

3. An assembly as in claim 1 wherein said reinforcing means comprises a rigid material reinforcing element having a substantially curvilinear longitudinal configuration corresponding to the configuration along the length of said casing and secured to an inner portion of said casing in spaced relation to the user of the assembly and said outer surface.

4. An assembly as in claim 3 further comprising padding means disposed on said casing in protective disposition to the user, said reinforcing element being secured adjacent said inner surface and at least partially in covered relation by said padding means.

5. An assembly as in claim 1 whereinsaid reinforcing means is secured to said force directing means at opposite ends thereof and cooperatively structured and disposed with said casing to at least partially absorb and direct forces on said casing to the support structure of the user.

6. An assembly as in claim 5 wherein said reinforcing means comprises a rigid material reinforcing element of one-piece, integral construction fixedly secured at opposite ends thereof to said force directing means, the latter being substantially fixedly positioned relative to said outward projection.

7. An assembly as in claim 5 wherein said reinforcing means comprises a reinforcing element fixedly attached in part to said casing and further attached at opposite ends thereof to said force directing means, said reinforcing element including adjustment means structured for longitudinal adjustment of said reinforcing element and selective positioning of said force directing means relative to said outward projection, whereby the overall dimensions of said assembly may be varied to accommodate the length of the term of pregnancy of the user.

8. An assembly as in claim 7 wherein said adjustment means further includes a positive interlock assembly defining a plurality of extended positions of each of said opposite ends of said adjustment means.

9. An assembly as in claim 1 wherein said force directing means comprises substantially outwardly flared flanges respectively disposed to define an extremity of each of said opposite longitudinal ends, each flange disposed in abutting force transferring engagement with a substantially upright portion of the support structure of the user.

10. An assembly as in claim 9 wherein said attachment means comprises aperture means integrally formed in each of said flanges and further comprising a plurality of keeper elements mounted on said outer surface and structured to removably engage and maintain a safety harness in overlapping, retaining relation to said outer surface, the aperture means is integrally formed in said flanges and dimensioned to allow passage therethrough of a connector element of the safety harness; said plurality of keeper elements comprising an open-ended construction for removable passage of the safety harness therein and in overlapping relation to said outer surface.

11. An assembly as in claim 1 wherein said outward projection is dimensioned and configured to extend outwardly from a user thereof a predetermined fixed distance dependent on the stage of pregnancy and the amount of projection of the abdominal area of the user.

12. A shield assembly of the type primarily designed to protect the abdominal area of a pregnant woman against external forces exerted thereon while seated, said assembly comprising:
(a) a casing formed of a rigid, high resistance material, being configured to include an outward projection and being dimensioned for at least partially surrounding and overlying relation to an abdominal region of a user's body,
(b) attachment means mounted on said casing and structured for removable securement of said assembly on a structure supporting the user,
(c) said casing comprising an outer surface and an inner surface, said outer surface including an overall, generally convex configuration and said inner surface comprising a substantially overall concave configuration,
(d) force directing means secured to opposite longitudinal ends of said casing for transfer of forces exerted on said casing to the supporting structure, and
(e) said force directing means disposed on opposite sides of the user and in abutting, force transferring engagement with surface portions of the supporting structure of the user, and
(f) said casing disposed in substantially covering relation to the abdominal portion of the user and said inner surface configured and cooperatively structured with said force directing means to remain at all times in spaced relation to the abdominal portion of the user when force is exerted on said casing.

13. A shield assembly of the type primarily designed to protect the abdominal area of a pregnant woman against external forces exerted thereon while seated, said assembly comprising:
(a) a casing formed of a rigid, high resistance material, being configured to include an outward projection and being dimensioned for at least partially surrounding and overlying relation to an abdominal region of a user's body,
(b) attachment means mounted on said casing and structured for removable securement of said assembly on a structure supporting the user,
(c) said casing comprising an outer surface and an inner surface, said outer surface including an overall, generally convex configuration and said inner surface comprising a substantially overall concave configuration, said inner surface disposed in substantially covering and at least partially spaced relation to the abdominal portion of the user,
(d) force directing means secured to opposite longitudinal ends of said casing for transfer of forces exerted on said casing to the supporting structure,
(e) said force direction means disposed on opposite sides of the user and in abutting, force transferring engagement with surface portions of the supporting structure of the user,
(f) said force directing means comprising substantially outwardly flared flanges respectively disposed to define an extremity of each of said opposite longitudinal ends, each flange disposed in abutting force transferring engagement with a substantially upright portion of the support structure of the user, and
(g) each of said flanges being adjustably positioned relative to said outward projection of said casing, whereby the overall dimensions of said assembly may be varied to accommodate the user's stage of pregnancy.

14. An assembly as in claim 13 wherein said force directing means further comprises a foot portion secured to each of said flanges and engaging a portion of the support structure of the user.

* * * * *